United States Patent [19]

Swenson et al.

[11] Patent Number: 5,526,511

[45] Date of Patent: Jun. 11, 1996

[54] ENHANCED LEAST RECENTLY USED ROUND ROBIN CACHE MANAGEMENT METHOD AND APPARATUS FOR ALLOCATION AND DESTAGING OF CACHE SEGMENTS

[75] Inventors: Robert E. Swenson, Mendota Heights; Kevin W. Bengtson, Shoreview, both of Minn.

[73] Assignee: Unisys Corporation, Blue Bell, Pa.

[21] Appl. No.: 173,443

[22] Filed: Dec. 23, 1993

[51] Int. Cl.$^6$ .................................................. G06F 12/12
[52] U.S. Cl. .......................................... 395/461; 395/463
[58] Field of Search .................................. 395/425, 460, 395/463, 470, 440, 461

[56] References Cited

U.S. PATENT DOCUMENTS

| | | | |
|---|---|---|---|
| 4,195,343 | 3/1980 | Joyce | 395/460 |
| 4,314,331 | 2/1982 | Porter et al. | 395/460 |
| 4,603,380 | 7/1986 | Easton et al. | 395/440 |
| 4,636,946 | 1/1987 | Hartung et al. | 395/463 |
| 4,967,353 | 10/1990 | Brenner et al. | 395/487 |
| 5,235,690 | 8/1993 | Beardsley et al. | 395/440 |
| 5,253,351 | 10/1993 | Yamamoto et al. | 395/445 |
| 5,263,145 | 11/1993 | Brady et al. | 395/441 |
| 5,325,509 | 6/1994 | Lautzenheiser | 395/464 |
| 5,353,425 | 10/1994 | Malamy et al. | 395/471 |

OTHER PUBLICATIONS

E. I. Cohen, et al., *Storage Hierarchies*, IBM Systems Journal, vol. 28, No. 1, 1989, pp. 62–76.

*Primary Examiner*—Tod R. Swann
*Assistant Examiner*—David J. O'Neill
*Attorney, Agent, or Firm*—LeRoy D. Maunu; Charles A. Johnson; Mark T. Starr

[57] ABSTRACT

The disclosure relates to a cache management method for a post-store cache. Recently referenced units of storage in the cache are identified and a round robin cache replacement method is generally used to select a unit of storage for replacement if the unit of storage has not been recently referenced. Recently used segments are identified by maintaining a Recently Used Zone ahead of the storage location presently considered for replacement. For each reference to a unit of storage in the cache which results in a miss, a portion of the cache is scanned for units of storage to destage.

13 Claims, 8 Drawing Sheets

| | | | | |
|---|---|---|---|---|
| 0 | RES. | IXP# | PATH_ID | SEGMENT FLAGS |
| 1 | FILE_IDENTIFIER ||||
| 2 |  ||||
| 3 | FILE_RELATIVE_SEGMENT_OFFSET ||||
| 4 | HASH_LINK_BADPTR/NAIL_LINK ||||
| 5 | DATA_POINTER || | FLAG ANNEX | BPID |
| 6 | BLOCKS_WRITTEN_TEMPLATE ||||
| 7 |  ||||
| 8 | HOST_ID | GROUP_ID | FILE_SESSION | HOST-SESSION ||
| 9 | LEG1_DISK_NUMBER ||||
| 10 | LEG2_DISK_NUMBER ||||
| 11 | LEG1_DISK_ADDRESS ||||
| 12 | LEG2_DISK_ADDRESS ||||
| 13 | UNUSED ||||
| 14 |  ||||
| 15 | PROGRAM_ID ||||

| | 0 3 | 4 5 | 6 | 11 12 | 17 18 | 23 24 | 29 30 | 35 |
|---|---|---|---|---|---|---|---|---|
| | \multicolumn{8}{l|}{PROGRAM STATUS PACKET (PSP)} |
| 0 | VALID_FLG | | | RESERVED | | UPI_NUMBER | | |
| 1 | RES | | PROGRAM_ID | | | | | |
| 2 | COMMAND_PACKET_ADDRESS | | | | | | | |
| 3 | HARDWARE_DEPENDENT_STATUS_1 | | | | | | | |
| 4 | HARDWARE_DEPENDENT_STATUS_2 | | | | | | | |
| 5 | RECOMMENDED_ACTION | | | REASON | | COUNT | FLAGS | |
| 6 | STATISTICS | | | | | | | |
| 7 | RECOVERY_TIME | | DEPENDS ON NO_PROGRAM AND COMMAND_CODE | | | | | |
| 8 ... 119 | DEPENDS ON NO_PROGRAM AND COMMAND_CODE | | | | | | | |
| 120 ... 127 | RESERVED FOR SOFTWARE | | | | | | | |

ENHANCED LEAST RECENTLY USED ROUND ROBIN CACHE MANAGEMENT METHOD AND APPARATUS FOR ALLOCATION AND DESTAGING OF CACHE SEGMENTS

CO-PENDING PATENT APPLICATIONS

This patent application is related to the co-pending patent application entitled, "Outboard File Cache System" to Thomas P. Cooper and Robert E. Swenson, which was filed Dec. 23, 1993, is assigned to the assignee of the present invention, and is herein incorporated by reference.

BACKGROUND OF THE INVENTION

1. Field of the Invention

This invention generally relates to cache storage in a multilevel data storage hierarch and more particularly to management of the available cache storage.

2. Description of the Prior Art

The performance of data processing systems has improved dramatically through the years. While new technology has brought performance improvements to all functional areas of data processing systems, the advances in some areas have outpaced the advances in other areas. For example, advancements in the rate at which computer instructions can be executed have far exceeded improvements in the rate at which data can be retrieved from storage devices and supplied to the instruction processor. Thus, applications that are input/output intensive, such as transaction processing systems, have been constrained in their performance enhancements by data retrieval and storage performance.

The relationship between the throughput rate of a data processing system, input/output (I/O) intensity, and data storage technology is discussed in "Storage hierarchies" by E. I. Cohen, et al., IBM Systems Journal, 28 No. 1 (1989). The concept of the storage hierarchy, as discussed in the article, is used here in the discussion of the prior art. In general terms, the storage hierarchy consists of data storage components within a data processing system, ranging from the cache of the central processing unit at the highest level of the hierarchy, to direct access storage devices at the lowest level of the hierarchy. I/O operations are required for access to data stored at the lowest level of the storage hierarchy.

Caching takes place at various levels of the storage hierarchy. An instruction processor cache caches data stored in main memory and main memory essentially caches data stored in secondary storage. A second level cache between an instruction processor cache and the main memory is used in the 2200/900 Series data processing system from Unisys Corporation. Secondary storage devices, such as disk subsystems, are also available with a cache between the electromechanical storage device and the main memory of data processing system.

The cache at each level of the hierarchy requires management logic to control the allocation of available cache storage. The cache management scheme chosen will impact the performance enhancement sought by caching. Two common cache replacement methods are used to select an allocable portion of cache storage in which to store data when a cache miss is encountered. The round robin replacement method is simple to implement, however, the cache hit rate may suffer due to its simplicity. On the other hand, selecting the least-recently-used entry in the cache to replace may enhance the hit rate at the expense of operational complexity.

A round robin replacement scheme for a cache store is described in U.S. Pat. No. 4,195,343 to Thomas F. Joyce. The round robin method constitutes a first-in first-out policy for cache replacement. Implementation is simple because the logic need only cycle through the available cache store in selecting a location for replacement. A disadvantage to this method is that it ignores the possibility that once a location is referenced, is it likely to be referenced again. Therefore, it would be desirable not to replace recently referenced locations to avoid reading the data from storage and writing it to the cache store. The least-recently-used method addresses this concern.

U.S. Pat. No. 4,636,946 to Michael H. Hartung and Gerald E. Tayler describes the use of a least-recently-used method for cache replacement in a caching a disk storage apparatus. A list of the cache store locations is maintained and is ordered from least-recently-used to most-recently-used. Generally, when a location in the cache store is to be replaced, the least-recently-used location is selected. A drawback to this method is that each time a location in the cache store is referenced, the referenced location must be moved to the most recently used end of the ordered list of cache store locations.

Determining when to write updated cache store locations back to storage, commonly referred to as destaging, is also an important aspect of cache management. As pointed out in U.S. Pat. No. 4,636,946, it is desirable to move data from cache to storage before the cache storage space is needed for allocation. In addition, U.S. Pat. No. 4,636,946 teaches scanning the least-recently-used list for modified data in the cache to be moved to a backing retentive store. The patent does not teach destage control where the backing store to which data is to be destaged is not directly accessible by the cache control.

SUMMARY OF THE INVENTION

It is an object of the invention to manage allocation of cache storage with a method that is simple to implement and which does not reallocate cache storage when data in the cache storage is likely to be referenced again.

Another object is to allocate cache storage using a round robin method for allocating cache storage without selecting for allocation cache storage which has been recently referenced.

A further object of the invention is to make cache storage available for allocation without unnecessarily destaging cache storage which has been recently referenced.

Still another object of the invention is to make cache storage available for allocation where the cache storage is shared by a plurality of host processors.

According to the present invention, the foregoing and other objects and advantages are attained by establishing a replacement candidate segment in cache storage and a recently used zone ahead of the replacement candidate segment. The cache storage is allocable by segment. The recently used zone encompasses one or more segments of the allocable cache storage. When reference is made to a segment within the recently used zone, the segment is designated as recently used. When reference is made to data which is not present in cache storage, the replacement candidate segment is considered for allocation and storage of the data referenced. If the replacement candidate segment has been designated as recently used, then the next addressable segment in cache storage is selected as the replacement candidate segment to be considered for allocation. Segments are considered for allocation until a segment which has not been recently referenced is found.

In accordance with another aspect of the invention, a destage zone is established ahead of the replacement candidate segment. The destage zone encompasses one or more allocable segments of cache storage. When reference is made to data which is not present in cache storage, segments within the destage zone are considered for destaging. If the segment has been written and not destage to disk, and the segment has been recently referenced, the segment is destaged. The destaged segment is thereby made available for allocation.

Corresponding to another aspect of the invention, multiple hosts share the cache storage. Some of the hosts have access to disks which others of the hosts do not. Data in cache storage may be cached from a disk. When a host issues a cache command and the data referenced is not present in cache storage, the destage zone is searched for data for which destaging is required and is to be destaged to a disk to which the host which issued the cache command has access. If the host which issued the cache command may then destage the selected segments thereby making additional cache storage available for allocation.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 4 shows the information contained in a File Descriptor;

FIG. 6 shows the format and information contained in a Program Status Packet;

DESCRIPTION OF THE PREFERRED EMBODIMENT

The preferred embodiment of the present invention is described in terms of an Outboard File Cache as described in the co-pending patent application which has been incorporated herein by reference. It should be understood, and those skilled in the art will recognize that the present invention could be practiced in caches other than an Outboard File Cache. For example, the present invention could find applicability in disk cache systems and other caches where a round robin cache replacement policy is suitable.

The unit of allocable storage in the Outboard File Cache is a segment. A segment consists of 1792 words and for convenience corresponds to the unit of storage allocation for files by the 2200 Series Operating System from Unisys Corporation. Those skilled in the art will recognize that the present invention could be used with different units of storage allocation. For the purposes of this specification, each storage location which is allocable by the cache management processing is referred to as a "segment."

Figure 1:
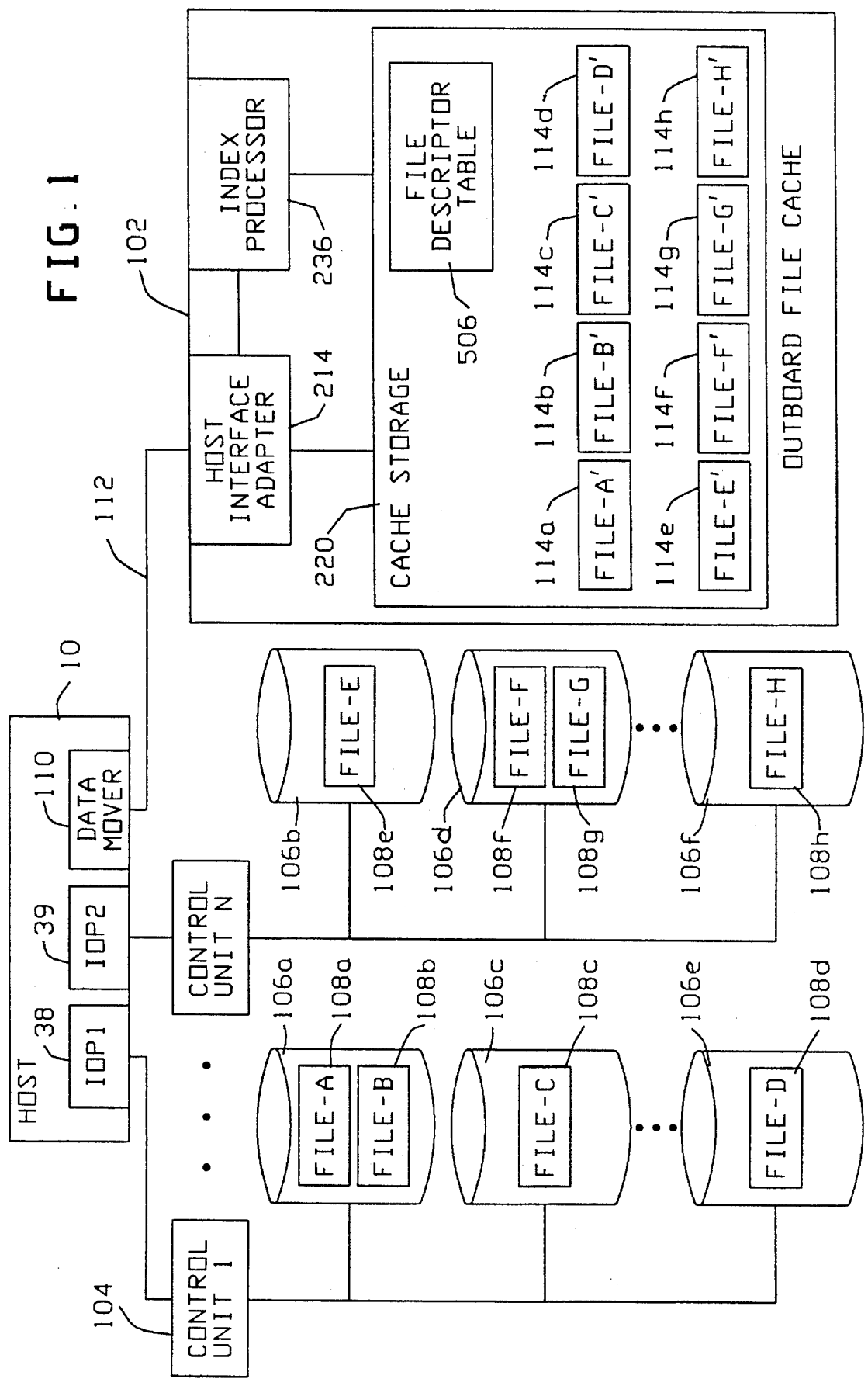
FIG. 1 illustrates an Outboard File Cache in a data storage hierarchy.

FIG. 1 illustrates an Outboard File Cache in a data storage hierarchy. An exemplary Host 10 is a 2200/900 Series data processing system which is commercially available from the Unisys Corporation. IOP 38 and 39 are microprocessor controlled units that control the initiation, data transfer, and termination sequences associated with software generated I/O channel programs. A plurality of Control Units 104 are coupled to Host via IOPs for providing access to Disks 106a–f. Application and system software executing on Host reads data from and writes data to Files 108a–h. While Files 108a–h are depicted as blocks it should be understood that the data is not necessarily storage contiguously in the Disks. The Disks provide mass storage for retaining the Files. In the storage hierarchy, disks would fall into the category of secondary storage, with primary storage being the main memory of a Host.

Outboard File Cache 102 provides cache storage for Files 108a–h with resiliency against data loss which is comparable to Disks 108. A Data Mover 110 is coupled to the Input/Output Bus 40 in the Host and provides a functionality which is similar to the IOPs 38. The Data Mover provides a Fiber Optic Link 112 to the Outboard File Cache. All or part of Files 108 may be stored in the Outboard File Cache 102 depending upon the storage capacity of the Outboard File Cache 102, and the size and number of Files 108 selected to be cached.

The portion of Files 108a–h that are stored in the Outboard File Cache 102 are shown as blocks 114a–h. The cached portion of Files 108a–h are labeled File-A', File-B', . . . , File-H' for discussion purposes. File-A'114a is the portion of File-A that is stored in Outboard File Cache 102, File-B' 114b is the portion of File-B that is stored in Outboard File Cache 102, etc. The Outboard File Cache at this level of the storage hierarchy allows references to cached files to be immediately directed to the Outboard File Cache 102 for processing, in contrast with a non-cached file where an I/O channel program must be constructed to access the proper disk and the request and data must flow through a possibly lengthy data path.

The HIA 214 provides functionality in the Outboard File Cache 102 which is similar to the functionality provided by the DM 110 on the Host 10. In particular, the HIA receives file access commands sent from the DM and provide general cache access control such as writing file data sent from the Host to Non-Volatile Cache Storage 220 and reading file data from Cache Storage and sending it to the Host. The HIAs also contain the logic for sending and receiving data over fiber optic Cable 112.

Index Processors (IXP) 236 manages allocation and cache replacement for the storage space available in Cache Storage 220, service file data access commands sent from Host 10, and generally provides for overall file cache management. The IXPs contain microcode control for detecting whether the file data referenced in a file data access command is present in the cache memory, and for managing and coordinating access to the cache memory.

Figure 2:
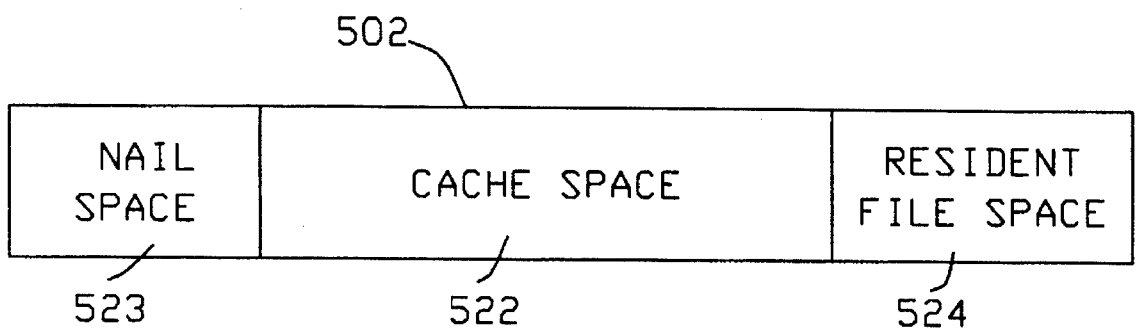
FIG. 2 shows the logical division between Cache File Space, Nail Space, and Resident File Space in the File Space of the Outboard File Cache.

FIG. 2 shows the logical division between Cache File Space, Nail Space, and Resident File Space in the File Space of the Outboard File Cache. The proportion of segments allocated between Cache File Space 522, Nail Space 523, and Resident File Space 524 varies according to runtime requirements. Cache File Space is allocated segment by segment to files. As demand for Cache File Space increases, allocation of segments is managed according to a cache replacement algorithm. Segments in Resident File Space are assigned to tracks of files which are to remain in File Space for an extended period of time. For example, Resident File Space may be used for files which are accessed frequently and for data which is recovery critical. The segments in Resident File Space are not eligible for replacement by the cache replacement algorithm for Cache File Space. An overview of Cache File Space management and Resident File Space management is provided in the following paragraphs.

A segment in Cache File Space 522 may either be "nailed" or "unnailed." A nailed segment is one that is permanently stored in the Outboard File Cache 102. A nailed segment remains in Cache File Space until it is purged by a Host 10. The Outboard File Cache never initiates deassignment and destaging of a nailed segment because there is no disk space backing up a nailed segment. Nailed segments are used where Host software determines that certain segments must be in cache when accessed and should not be eligible for cache replacement, such as for recovery files. Nailed segments can only reside in Cache File Space but are not allowed to consume all of Cache File Space. The desired maximum number of nailed segments is 1000.

An unnailed segment will remain in Cache File Space 522 until any one of the following occurs:

1. The unnailed segment is purged by Host 10 software.

2. The Outboard File Cache 102 detects that the RAM occupied by the segment is unusable.

3. The Cache File Space replacement algorithm determines that the segment should be assigned to another track.

4. The Outboard File Cache determines that the segment should be removed from Cache File Space and made part of the Resident File Space 524.

Resident File Space 524 is comprised of segments which are associated with tracks of files. Once a segment in Resident File Space is assigned to a track, it will remain assigned until any one of the following occurs:

1. The segment is purged by a Host 10.

2. The Outboard File Cache 102 detects that the RAM occupied by the segment is unusable.

3. The Outboard File Cache 102 determines that the demand for Resident File Space relative to the demand for Cache File Space 522 is such that the segment should be deassigned so that it can be allocated to Cache File Space.

Allocation of segments in Resident File Space 524 is done on a first-come first-served basis. Once all Resident File Space segments have been allocated, a segment in Cache File Space 522 is allocated. A segment in Cache File Space which is allocated to a file which has other segments in Resident File Space, is subject to the Cache File Space cache replacement algorithm. Therefore, Host 10 software which requests Resident File Space must monitor the availability and usage of Resident File Space.

Figure 3:
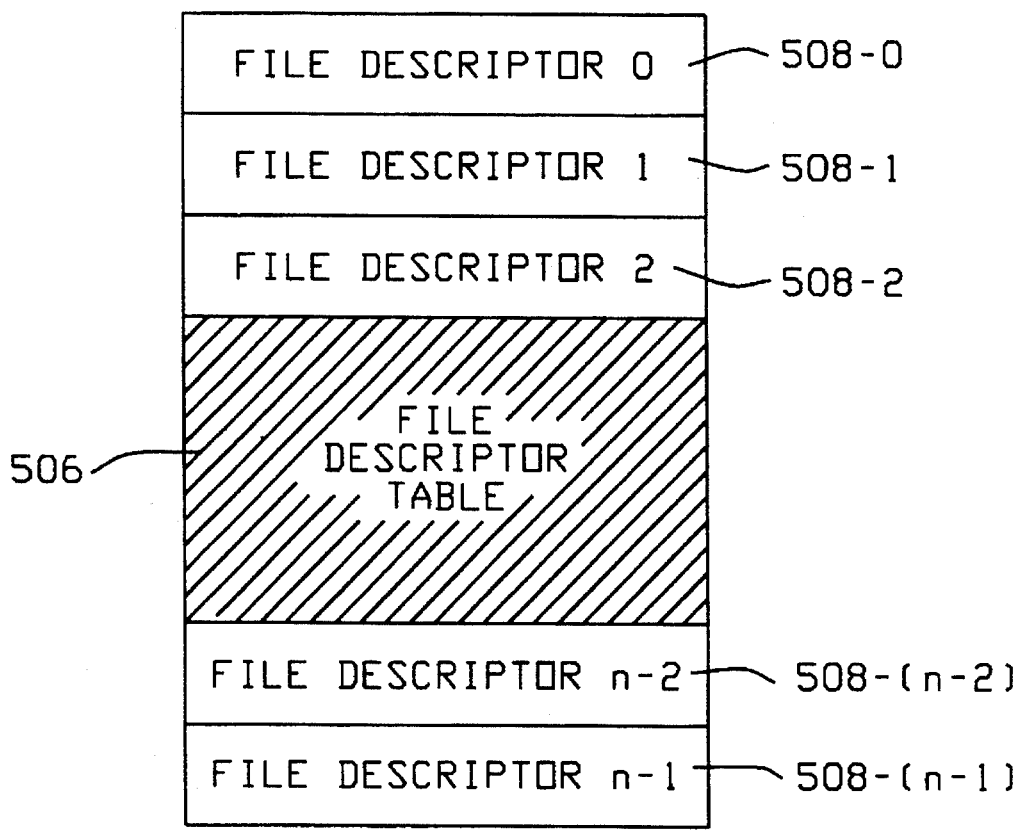
FIG. 3 illustrates the File Descriptor Table.

FIG. 3 illustrates the File Descriptor Table. The File Descriptor Table 506 is stored and maintained by the Outboard File Cache 102 and contains information for allocation and referencing each of the segments in the File Space 502. There are n File Descriptors in the File Descriptor Table, numbered consecutively from 0 to n−1 and respectively referenced 508-0, 508-1, 508-2, . . . , 508-(n−1).

FIG. 4 shows the information contained in a File Descriptor. Each File Descriptor 508 has 16 32-bit words. The content and format of a File Descriptor is as follows:

| Word | Bit | Definition |
| --- | --- | --- |
| 0 | 0–3 | These bits are reserved. |
| 0 | 4–7 | IXP_# identifies the last IXP which updated this File Descriptor. This flag is useful for troubleshooting. |
| 0 | 8–15 | The PATH_ID indicates the Host Interface Adapter 214 that is in the process of destaging, purging, or staging the segment. |
| 0 | 16–31 | SEGMENT FLAGS are used to indicate various characteristics of the segment referenced by the File Descriptor 508. The flags include the following: SEGMENT_WRITTEN is set when the segment has been updated via a write command since the segment was assigned. This flag is cleared when the segment is destaged. TOTAL_SEGMENT_VALID is set when all blocks within a segment are valid. A segment is valid when each block in the segment contains the most recent copy of the user's data. SEGMENT_DISABLED identifies when a hardware error was discovered for the associated segment. SPECULATIVE/ORPHAN is a context sensitive flag. If the RESIDENT_FILE flag is set, then this flag indicates whether the segment is an orphan segment. If the RESIDENT_FILE flag is not set, this flag indicates whether the segment was speculatively allocated. SEGMENT_UNAVAILABLE is used to indicate whether the segment referenced by the File Descriptor is eligible for cache replacement (reassignment). If this flag is set, then cache replacement algorithm does not consider the referenced segment for reassignment. When this flag is set, the HASH_LINK points to the next segment available for cache replacement SEGMENT_BUSY is used to indicate whether a read or write operation is in progress for the referenced segment. The flag is set when |

| Word | Bit | Definition |
|---|---|---|
| | | a command is decoded, and remains set until the BLOCKS_WRITTEN_TEMPLATE has been updated. PURGE_PENDING is used to indicate that a PURGE command found the referenced segment had been updated, and is presently waiting for the segment to be destaged before purging the segment. DESTAGE_PENDING is used to indicate that a DESTAGE command is in process. The flag is set when a DESTAGE command is decoded and cleared when the corresponding DESTAGE COMPLETE command is decoded. STAGE_PENDING is used to indicate that a READ or WRITE command resulted in a miss condition, the segment has been assigned, and the segment is busy until the data has been written to the segment. ALLOCATED_WRITE_MISS this flag indicates that the segment was assigned by either an ALLOCATE command or a WRITE command. SEQUENTIAL_SEGMENT is set when multiple segments are staged together or where the segment immediately preceding the segment is a segment with the same FILE_IDENTIFIER. The flag is used for determining which segments should be destaged as a group. RESIDENT_FILE indicates whether the segment belongs to a Resident File. STICKING_MASTER indicates whether the Host 10 has specified that the segment should have a longer lifetime in the cache than segments whose STICKING_MASTER flag is not set. NAIL is set when a segment is not eligible for reassignment. The Index Processor 236 sets the NAIL flag for a segment for segments which are Nailed and segments which belong to Resident files. HOSTNAIL is set when a segment in Nail Space has been created by the ALLOCATE command. PRE-USE is set by an IXP 236 to prevent another IXP from using the segment. This flag indicates that an IXP has reserved the segment so that the segment is immediately available for assignment by the IXP. |
| 1–2 | | FILE_IDENTIFIER identifies the File 106 to which the segment is assigned. |
| 3 | | FILE_RELATIVE_SEGMENT_OFFSET indicates the location of the segment relative to the first segment in the file. |
| 4 | | HASH_LINK/BADPTR/NAIL_LINK is the pointer to the next File Descriptor in a linked list of File Descriptors. If the SEGMENT_UNAVAILABLE flag is set, the value in this field is used as the BADPTR. which is a pointer to the next Segment whose BAD_OR_UNAVAILABLE_AREA is not set. If the NAIL flag is set, then the value in this field is used as the NAIL_LINK which points to the next File Descriptor for a nailed Segment. |
| 5 | 0–20 | DATA_POINTER is the physical address in NVS 220 where the segment is stored. It is fixed at initialization and always points to the same segment. |
| 5 | 21–27 | FLAG ANNEX contains more flags which indicate characteristics of the segment referenced by the File Descriptor 508. The flags include the following: STICKING_SLAVE is used to indicate the number of times the round robin cache replacement processing should exclude the referenced segment from consideration for replacement. DESTAGE_REPORTED is used to ensure that the IXP does not make more than one request for the segment to be destaged. NEW is set if the Segment is within K Segments from selection for reassignment by the cache replacement algorithm. K is equal to one-half the number of segments available in Cache File Space 522. NOTEPAD is a flag which has multiple uses that are beyond the scope of this invention. |
| 5 | 28–31 | BPID is the Back Panel Identifier associated with the Cache Storage 220 in which the segment is located. |
| 6–7 | | BLOCKS_WRITTEN_TEMPLATE contains one bit for each block in the segment. If a bit is set, it indicates that at some time after the segment was last destaged, the corresponding block was updated. |
| 8 | 0–7 | HOST_ID is a value identifying the Host 10 that is in the process of destaging, purging, or staging the segment. |
| 8 | 8–15 | GROUP_ID indicates the group of Hosts 10 that are able to destage the segment. In particular, the Group Identifier is the group of Hosts 10 that have direct access to the Disks 106 identified by the LEG1_DISK_NUMBER and LEG2_DISK_NUMBER. The group of Hosts 10 identified by the Group Identifier is called a "destage group." There are three types of destage groups: local, shared, and global. If the Group Identifier equals 0, then the segment belongs to the global destage group; if the Group Identifier equals 1, then the segment belongs to a local destage group; and if 2 <= Group Identifier <= 255, then the segment belongs to a shared destage group. The number of local destage groups is equal to |

| Word | Bit | Definition |
|---|---|---|
| | | the number of Hosts 10 which are coupled to the Outboard File Cache 102. There are 255 possible local destage groups. A segment which is assigned to a local destage group can only be destaged by the Host 10 to which that local destage group is assigned. Note that if GROUP_ID = 1, the HOST_ID contained in the FILE_IDENTIFIER must not equal zero and must specify a connected Host 10 that is able to destage the segment. Otherwise, an error state has occurred. There are 254 possible shared destage groups. The set of Hosts 10 contained in a shared destage group is defined by the Host 10 software. The particular Hosts 10 contained in each shared destage group is dependent upon the Hosts 10 which are coupled to the Outboard File Cache 102, the Disks 106 which are shared between the Hosts 10, and the particular files shared among the Hosts 10. |
| 8 | 16-23 | FILE_SESSION is used for recovery purposes when a Host fails unexpectedly. This field is beyond the scope of this invention. |
| 8 | 24-31 | HOST_SESSION is Host Session Number in which the segment was assigned to a file belonging to the Host. The Host Session Number is used for recovery purposes when a Host fails unexpectedly. This field is beyond the scope of this invention. |
| 9 | 0-31 | LEG1_DISK_NUMBER identifies the first disk on which the segment is stored. "Leg" refers to the I/O Path on which the disk resides. |
| 10 | 0-31 | LEG2_DISK_NUMBER identifies the second disk on which the segment is stored. |
| 11 | | LEG1_DISK_ADDRESS specifies the address on the leg-1 disk at which the segment is stored. |
| 12 | | LEG2_DISK_ADDRESS specifies the address on the leg-2 disk at which the segment is stored. |
| 13-14 | | These words are unused. |
| 15 | | PROGRAM_ID identifies the Outboard File Cache program issued by a Host 10 that is in the process of destaging, purging, or staging the segment. |

Figure 5:
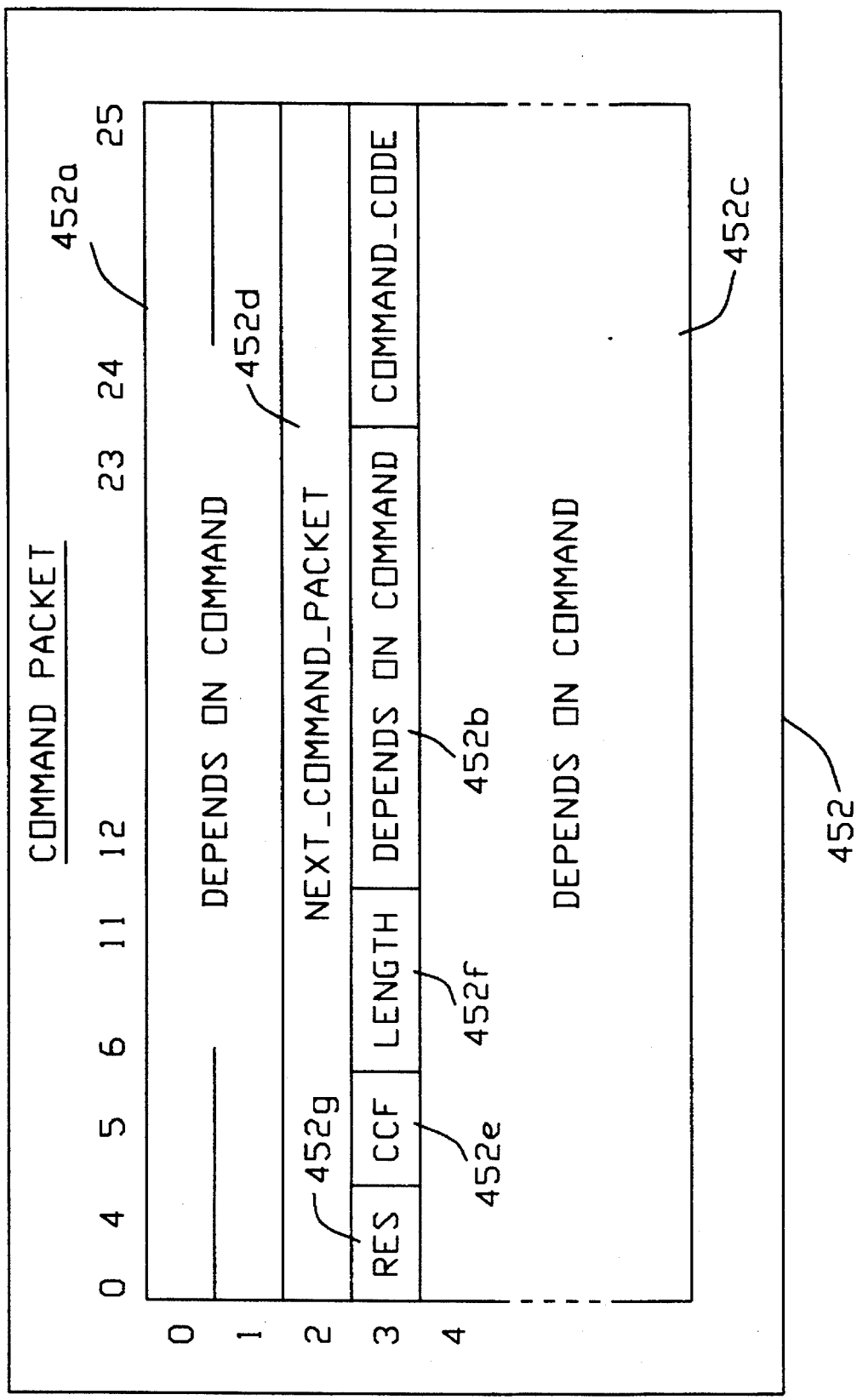
FIG. 5 shows the general layout of a Command Packet and the information contained therein.
Figure 8:
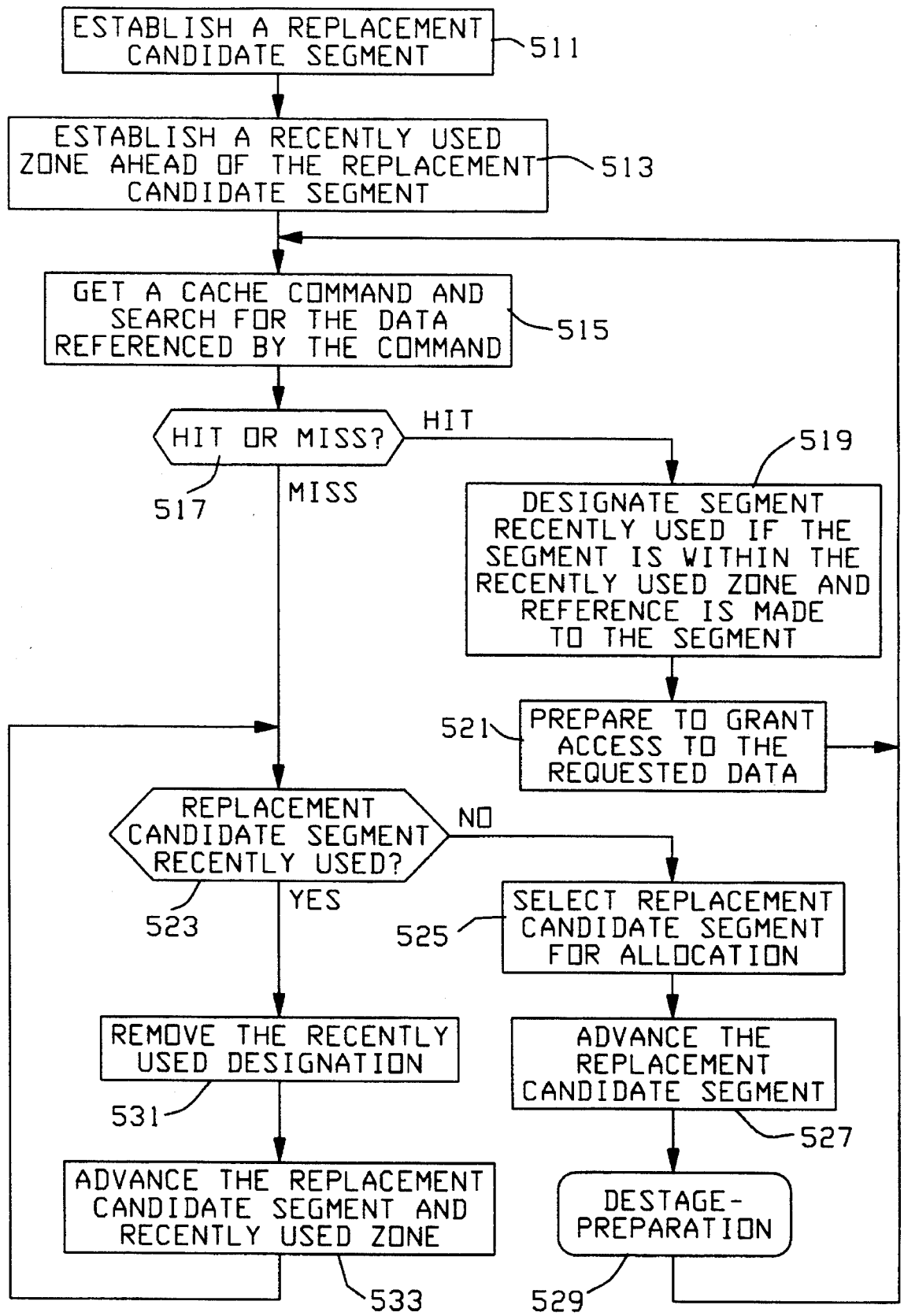
FIG. 8 contains a flowchart of the overall processing flow of round robin cache management processing.

FIG. 5 shows the general layout of a Command Packet and the information contained therein. The Command Packet 452 contains information that describes one of the available Outboard File Cache commands (read, write, stage, destage, etc.). FIG. 8 shows only the command information which is common to all Command Packets for the various command types.

A Command Packet can have from 4 to 67 36-bit words, depending upon the command type. Words 0 and 1, bits 12 through 23 of Word 3, and Words 4 through n of the Command Packet, respectively referenced by 452a, 452b, and 452c, are dependent upon the command type.

The file cache system permits Command Packets to be chained together. That is, a first Command Packet 452 may point to a second Command Packet, and the second Command Packet may point to a third Command Packet, and so on. The NEXT_COMMAND_PACKET 452d is used for chaining the Command Packets together. It contains the address of the next Command Packet in the command chain. If the CCF 452e (Command Chain Flag) is set, then NEXT_COMMAND_PACKET contains the address of the next Command Packet in the command chain. A chain of commands is also referred to as a "program." If CCF is clear, then no Command Packets follow the Command Packet in the command chain. The CCF is stored at Bit 5 of Word 3 in the Command Packet.

The LENGTH 452f of the Command Packet, that is the number of words in the Command Packet following Word 3, is stored in bits 6 through 11 of Word 3. Bits 24 through 35 of Word 3 contain COMMAND_CODE 452f which indicates the operation to be performed by the Outboard File Cache. Bits 0-4 of Word 3 and referenced by 452g are reserved.

FIG. 6 illustrates the format and information contained in a Program Status Packet. Generally, the content and format of a Program Status Packet 460 is as follows:

| Word | Bit | Definition |
|---|---|---|
| 0 | 0-5 | Valid Flag (VF) 460a indicates whether the Program Status Packet contains valid status information. If VF = 0, then the Program Status Packet does not contain valid status information. If the VF = 1, then the Program Status Packet does contain valid status information. |
| 0 | 6-17 | Reserved as referenced by 460b. |
| 0 | 18-35 | UPI_NUMBER 460c is the Universal Processor Interrupt (UPI) number associated with the Outboard File Cache interface. |
| 1 | 0-3 | Reserved as reference by 460d. |
| 1 | 4-35 | PROGRAM_ID 460e is a value which identifies the Command Packet (or Command Packet Chain) which is associated with the Program Status Packet. If NO_PROGRAM in the FLAGS field is set, PROGRAM_ID is reserved. Every Outboard File Cache program issued by a Host has an associated PROGRAM_ID which is unique within the Host. When status is returned to the Host, PROGRAM_ID is used to relate the status to the program to which it applies. Note that PROGRAM_ID applies to all commands within a single program. A status is associated with a command in a |

-continued

| Word | Bit | Definition |
|------|-----|------------|
| | | command chain by using the COMMAND_PACKET_ADDRESS. The portion of the File Cache Handler that builds and initiates Outboard File Cache programs generates the PROGRAM_ID. |
| 2 | 0–35 | COMMAND_PACKET_ADDRESS 460f is a value which contains the real address of the Command Packet to which the status applies. When a chain of commands is submitted to the Outboard File Cache 102 for processing, the Command Packet Address will point to the Command Packet which caused an error. If all the Command Packets in the command chain were processed without error, then the Command Packet Address points to the last Command Packet in the command chain. |
| 3 | 3–35 | HARDWARE_DEPENDENT_STATUS-1 460g is an address within Main Storage 16 which was referenced and an error was detected. The File Cache Handler Software 208 takes the RECOMMENDED_ACTION. |
| 4 | 0–35 | This word is reserved and is beyond the scope of this invention. |
| 5 | 0–11 | RECOMMENDED_ACTION 460i is the processing that should be performed by the Host 10 upon receiving a Program Status Packet. |
| 5 | 12–23 | REASON 460j indicates the condition that caused the particular status to be returned. |
| 5 | 24–29 | COUNT 460k is the recommended number of times that the Host should retry when responding to the status in the Program Status Packet. For example, if the RECOMMENDED_ACTION returned is Resend, then the Count indicates the number of times which the Host should resend the Command Packet. If NO_PROGRAM in the FLAGS field is not set and the RECOMMENDED_ACTION does not equal "no action required", this field specifies the number of times the command specified by the Command Packet pointed to by COMMAND_PACKET_ADDRESS should be retried. Retries apply only to that command and not to any other commands in a command chain. All retries use the same Outboard File Cache Interface to which the original command was directed. If NO_PROGRAM in the FLAGS field is not set and RECOMMENDED_ACTION equals "no action required", COUNT must be equal to 0. If NO_PROGRAM in the FLAGS field is set, this field is reserved. |
| 5 | 30–35 | FLAGS 460l is a set of bits that relay ancillary information. |
| 5 | 30 | PRIORITY_DESTAGE indicates whether priority destage is required. If PRIORITY_DESTAGE is set, then the Destage Request Packets in the Destage Request Table (see the READ Status Packet) refer to segments that must be destaged as soon as possible. If NO_PROGRAM is set or DESTAGE_REQUEST_PACKETS is not set, PRIORITY_DESTAGE must equal 0. |
| 5 | 31 | DESTAGE_REQUEST_PACKETS is a flag which indicates whether the Destage Request Table exists (see the READ Status Packet). If NO_PROGRAM is set, or the status applies to an invalid command, or the status applies to a non-I/O command, then this flag must be 0. |
| 5 | 32 | TERMINATED_POLLING is a flag which indicates that a program initiation queue is no longer being polled. |
| 5 | 33 | Reserved. |
| 5 | 34 | NO_PROGRAM is a flag that is beyond the scope of this invention. |
| 5 | 35 | Reserved and is beyond the scope of this invention. |
| 6 | 0–35 | STATISTICS 460m is a set of codes which indicate how successful the Outboard File Cache has been in avoiding destaging file data, speculating upon the future file access commands, and the time the Outboard File Cache spent in processing the Command Packet(s). |
| 7 | 0–11 | RECOVERY_TIME is used to indicate to a Host 10 that the Outboard File Cache 102 is in the process of performing a set of actions to recover from an internal fault condition. The nature of the fault recovery prohibit the Outboard File Cache from responding to any commands received from a Host. When a command is received, it is not processed by the Outboard File Cache and is returned to the sending Host with a RECOMMENDED_ACTION equal to "Resend." RECOVERY_TIME is only used when the NO_PROGRAM flag is not set and the RECOMMENDED_ACTION is Resend. The value contained in RECOVERY_TIME provides the number of six second intervals required to complete the necessary recovery actions. |
| 7 | 12–35 | See Words 8–127 |
| 8–127 | | These words contain information which is dependent upon the particular command in the Command Packet which is associated with the Program Status Packet. Words 7–119, referenced by 460n depend upon NO_PROGRAM and COMMAND_CODE (see the READ Status Packet), and words 120 through 127 are reserved for future use as referenced by 460o. |

Figure 7:
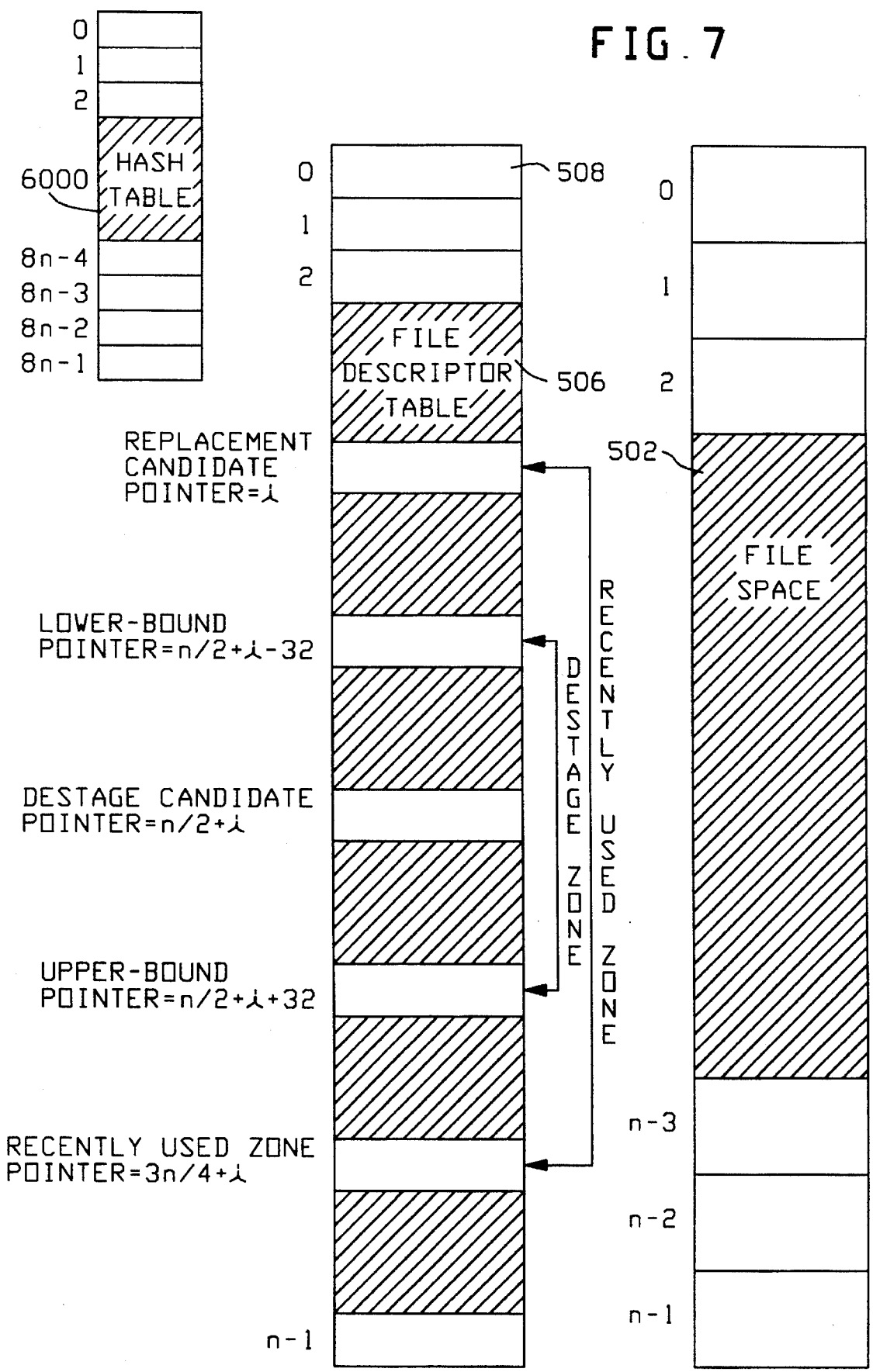
FIG. 7 illustrates logical block diagrams of the Hash Table, the File Descriptor Table, and File Space.

FIG. 7 illustrates logical block diagrams of the Hash Table 6000, the File Descriptor Table 506, and File Space 502. There are n cache segments available in File Space 502, numbered consecutively as 0, 1, 2, ..., n–2, n–1. There are also n File Descriptors in the File Descriptor Table 506. The Hash Table 6000 is the structure that makes the File Space 502 fully associative. That is, a segment in the File Space 502 can be allocated without sensitivity to its physical address.

The Hash Table 6000 contains 8n entries. Each entry is available to point to one of the File Descriptors 508 in the File Descriptor Table 506. At system start-up time, the pointers in the Hash Table 6000 are null. An entry in the Hash Table is made to point to a File Descriptor when a segment in File Space 502 is assigned to a particular segment of a file. The HASH processing in the co-pending application can be referenced for the details on the Hash function.

Entries in the Hash Table are locked in groups of eight. Therefore, when a File Descriptor is to be updated, the group of eight pointers in the Hash Table to which the pointer referencing the File Descriptor to be updated belongs is locked. The lock mechanism is required when the Outboard File Cache is configured with multiple Index Processors 236 and each is managing the File Descriptor Table.

The segment referenced in a cache command (issued via the Command Packets described in the co-pending application) is hashed to an entry in the Hash Table 6000. If the entry is null, then the referenced segment is not present in the cache; if the entry points to a File Descriptor, then the File Descriptor is compared to the particular segment requested in the Command Packet. If the segment referenced in the cache command matches the File Descriptor, then the referenced segment can found at the physical address (DATA_POINTER) contained in the File Descriptor 508. The HASH_LINK in the File Descriptor is used for resolving collisions between data references which hash to the same entry in the Hash Table.

Various pointers are maintained for overall cache management and in particular, for assigning, deassigning, and destaging segments in File Space 502. The pointers of interest in this preferred embodiment are the REPLACEMENT CANDIDATE, DESTAGE CANDIDATE, LOWER-BOUND, UPPER-BOUND, and RECENTLY USED ZONE pointers.

The REPLACEMENT CANDIDATE pointer references the File Descriptor 508 which in turn references the first segment to be considered for allocation when a cache command references a file segment not present in File Space 502. The referenced segment is referred to as the Replacement Candidate segment. The REPLACEMENT CANDIDATE proceeds in an incremental fashion around the File Descriptor Table 506. When File Descriptor n–1 is reached, REPLACEMENT CANDIDATE returns to File Descriptor 0. For illustrative purposes, REPLACEMENT CANDIDATE is shown as pointing to File Descriptor i in FIG. 7.

The DESTAGE CANDIDATE points to a File Descriptor 508 which references a segment in File Space 502 which is the segment under consideration for destaging. If the segment has been written, a request may be made to destage the segment, depending upon how recently the segment was referenced. If the segment was recently referenced, the segment will not be destaged, if the segment has been written but not recently referenced, a destage request will be made. Note that when multiple Hosts 10 have access to the Outboard File Cache, an additional test is performed to determine whether the Host 10 which submitted the cache command has access to the Disk 106 to which the Destage Candidate segment is to be destaged.

The DESTAGE CANDIDATE proceeds approximately $\frac{1}{2}n$ entries ahead of REPLACEMENT CANDIDATE in the File Descriptor Table 506. For illustrative purposes, DESTAGE CANDIDATE is shown as pointing to File Descriptor $\frac{1}{2}n+i$ in FIG. 7. Those skilled in the art will recognize that the DESTAGE CANDIDATE may also proceed a constant number of segments ahead of the REPLACEMENT CANDIDATE rather than varying relative to the number of segments available in File Space 502.

The LOWER-BOUND and UPPER-BOUND defines the bounds in the File Descriptor Table 506 within which the DESTAGE CANDIDATE is kept. The segment referenced by the DESTAGE CANDIDATE may not be eligible for destaging because it may be assigned to a Host 10 which is different from the Host which sent the cache command in process. Because the destage requests are made in the Command Status Packet returned to the Host which sent the cache command, the destage request must reference a segments to be destaged to a Disk 106 to which the Host which sent the cache command has access. The DESTAGE CANDIDATE is allowed to roam between the LOWER-BOUND pointer and the UPPER-BOUND pointer in search of segments to destage. For illustrative purposes, the LOWER-BOUND pointer is shown as pointing to File Descriptor $\frac{1}{2}n+i-32$, and the UPPER-BOUND pointer is shown as pointing to File Descriptor $\frac{1}{2}n+i+32$. As the REPLACEMENT CANDIDATE is incremented, each of the LOWER-BOUND and UPPER-BOUND pointer is also incremented. LOWER-BOUND and UPPER-BOUND also return to File Descriptor 0 after reaching File Descriptor n–1.

A Recently Used Zone is used in the round-robin cache replacement scheme described herein. It is desirable to not allocate (or "reassign") a segment which has been recently referenced because that segment is likely to be referenced again. A stage operation is saved if the segment which was not reassigned is referenced subsequent to it having been considered for allocation. The Recently Used Zone, along with the NEW flag in the File Descriptor 508, is used to designate segments which have been referenced recently. The NEW flag is an indicator for a segment which has been recently referenced. If a segment is referenced and it is within the Recently Used Zone, the NEW flag in the referenced segment's File Descriptor is set. When the REPLACEMENT CANDIDATE eventually points to the referenced segment, the referenced segment will not be allocated because it was recently referenced. The NEW flag in a File Descriptor will be cleared as the REPLACEMENT CANDIDATE pointer passes over the File Descriptor. The boundaries of the Recently Used Zone are defined by the REPLACEMENT CANDIDATE and the RECENTLY USED ZONE pointer which is 3n/4+i segments beyond the REPLACEMENT CANDIDATE pointer.

For the purposes of the discussion contained herein, it is assumed that the LOWER-BOUND, DESTAGE CANDIDATE, UPPER-BOUND, and RECENTLY USED ZONE pointers are always logically "ahead" of the REPLACEMENT CANDIDATE even though the REPLACEMENT CANDIDATE may reference a File Descriptor 508 which is physically ahead of the above pointers in the File Descriptor Table 506. Those skilled in the art will recognize that special checks are necessary when the REPLACEMENT CANDIDATE is physically ahead of the above pointers.

FIG. 8 contains a flowchart of the overall processing flow of round robin cache management processing. Steps 511 and 513 are performed when the cache is initialized to establish the starting point for cache replacement. Step 511 establishes a Replacement Candidate segment by initializing the REPLACEMENT CANDIDATE pointer as shown in FIG. 7. At initialization, the REPLACEMENT CANDIDATE pointer references File Descriptor 0 and after allocation of i−1 segments of File Space 502, the REPLACEMENT CANDIDATE would reference File Descriptor i.

Step 513 establishes a Recently Used Zone which encompasses a group of File Descriptors which are next in line to be considered as the Replacement Candidate. The Recently Used Zone is established by initializing a RECENTLY USED ZONE pointer a predetermined number of File Descriptors 508 ahead of the REPLACEMENT CANDIDATE pointer. In the preferred embodiment, the size of the Recently Used Zone is ¾ the number of available File Descriptors 508. The Recently Used Zone is advanced in lock-step with the Replacement Candidate.

A cache command is retrieved at Step 515 and the segments in the Outboard File Cache 102 are searched for the data referenced by the cache command. As described in the incorporated patent application, a cache command is sent from a Host 10 to the Outboard File Cache 102 in a Command Packet 452. The Index Processor 236 obtains the Command Packet from the Host Interface Adapter 214 and processes the cache command. The Index Processor 236 embodies the functionality for managing allocation of the available cache storage.

Decision Step 517 tests whether a hit or miss was generated in searching for the data referenced by the cache command. If the file data referenced is present in File Space 502, decision Step 517 directs control to Step 519. If the segment referenced by the cache command lies within the Recently Used Zone, Step 519 designates the segment as recently used. In the preferred embodiment, this is accomplished by setting the NEW flag in the File Descriptor 508 as described in the co-pending patent application. As is further described in the co-pending application, Step 521 prepares to grant access to the requested data as specified in the cache command. The preparation steps are determined by the particular cache command in the Command Packet 452 and more details are set forth in the co-pending application. Control is returned to Step 515 to obtain the next cache command for processing.

If the file data referenced by the cache command is not present in File Space 502, decision Step 517 directs control to decision Step 523. When the file data referenced by a cache command is not present in the File Space 502, cache management processing must select one or more segments in File Space to allocate to the file data to be staged. In deciding whether to allocate a segment, decision Step 523 determines whether the segment referenced by the REPLACEMENT CANDIDATE pointer has been designated recently used as indicated by the NEW flag in the File Descriptor 508. Control is directed to Step 525 if the Replacement Candidate segment is not recently used, i.e., the NEW flag was not set. Step 525 selects the Replacement Candidate segment for allocation to the file data referenced in the cache command. The File Descriptor associated with the allocated segment is updated with the information in the cache command (the Command Packet 452). In addition, the File Descriptor is removed from any hash list of which it is a part and relinked in the hash list corresponding to the data referenced in the cache command.

Step 527 advances the Replacement Candidate segment to the next segment in File Space 502 by incrementing the REPLACEMENT CANDIDATE pointer, thereby referencing the next File Descriptor 508 in the File Descriptor Table 506.

Step 529 initiates DESTAGE-PREPARATION processing. The Outboard File Cache 102 selects certain segments in File Space 502 for destaging and initiates the destage process by requesting that the Host 10 destage the selected segments. The destage requests are returned to the Host in a Status Packet 460 sent by the Outboard File Cache. The processing indicated by Step 529 specifies the general process by which segments are selected for destaging. Once any segments to destage have been selected and identified in the Status Packet, processing returns to Step 515 as described above.

If the Replacement Candidate segment has been designated recently used, decision Step 523 directs control to Step 531. Step 531 removes the recently used designation so that if the REPLACEMENT CANDIDATE pointer cycles around the File Descriptor Table 506 and the segment has not been designated as recently used, it may then be allocated. Step 531 accomplishes this by clearing the NEW flag in the File Descriptor 508. Step 533 advances the REPLACEMENT CANDIDATE pointer to the next File Descriptor 508 and advances the Recently Used Zone by incrementing the RECENTLY USED ZONE pointer. Control is returned to decision Step 523 to examine the new Replacement Candidate segment.

Figure 9:
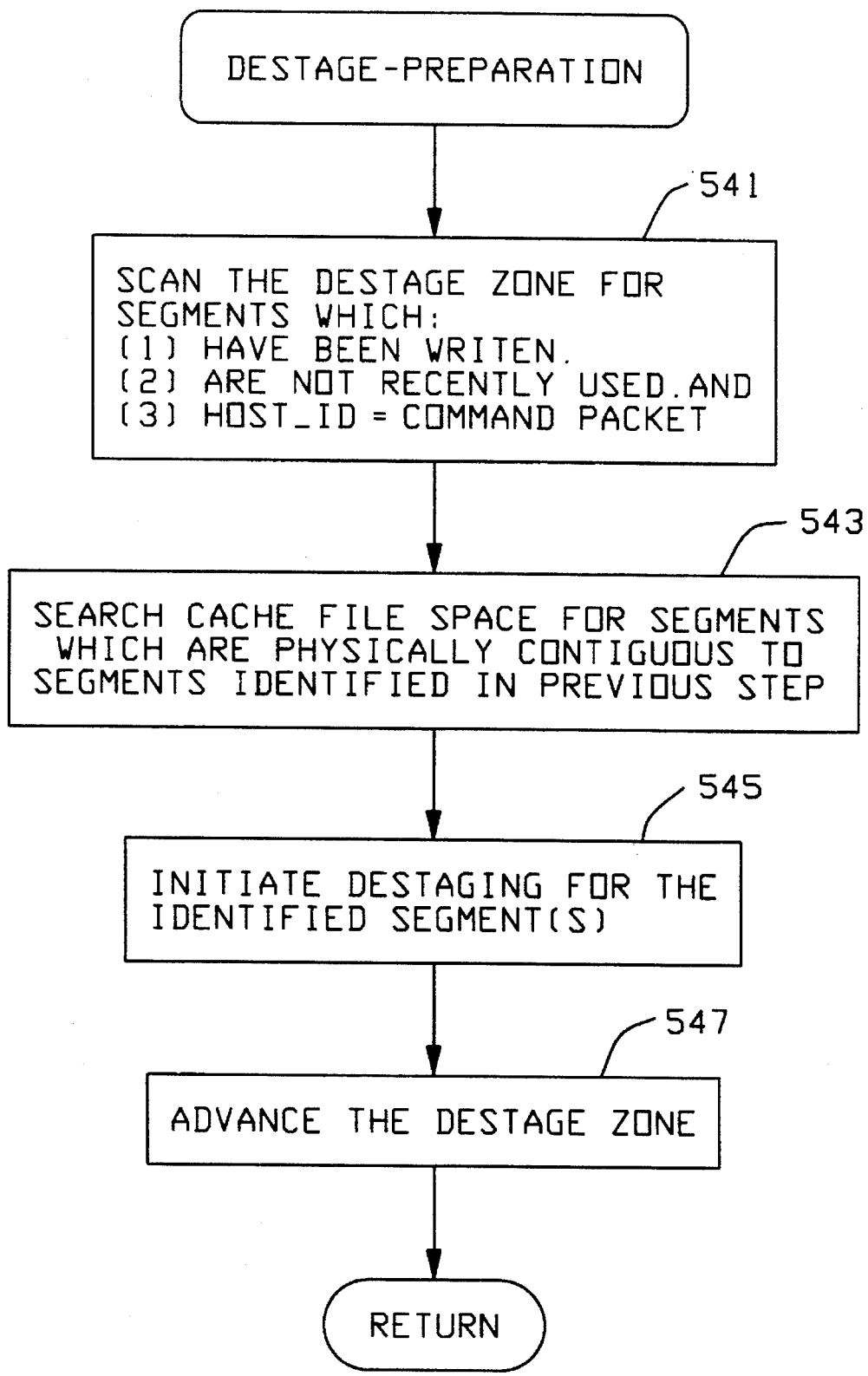
FIG. 9 contains a flowchart of the overall processing flow for destage preparation in round robin cache management processing.

FIG. 9 contains a flowchart of the overall processing flow for DESTAGE-PREPARATION processing in round robin cache management processing. Further processing details are found in the DESTAGE-CHECK and DESTAGE-GROUP processing described in the patent application incorporated herein.

Step 541 scans the Destage Zone for segments to destage. The Destage Zone is ahead of the REPLACEMENT CANDIDATE pointer so that any required destaging is completed before the REPLACEMENT CANDIDATE pointer has advanced to the segments for which destaging was required. The goal is to save processing time in allocating segments.

To be considered for destaging, a segment must satisfy certain criteria. First the segment must have been written and not destaged. That is, the segment in cache has been updated but the segment on Disk 106 has not. Second, the segment must be one which has not been recently referenced. Finally, the Host 10 which issued the cache command must have access to the Disk to which the segment is to be destaged. In the preferred embodiment, a segment will be destaged if the SEGMENT_WRITTEN flag is set, the NEW flag is not set, and the HOST_ID in the File Descriptor 508 matches that in the Command Packet 452.

Step 543 searches Cache File Space 502 for any segments whose DISK_ADDRESSES are physically contiguous with the segment selected at Step 541. The SEGMENT_WRITTEN and NEW flags for any segments identified which are physically contiguous are also tested to determine whether destaging is appropriate. This operation is performed to minimize the disk activity in destaging segments from the Outboard File Cache.

The segments identified at Steps 541 and 543 are reported to the Host 10 for destaging at Step 545. The destage requests are contained in a Status Packet 460. Upon receipt of a destage request, the Host will read the segments identified for destaging from the Outboard File Cache 102 and write them to the appropriate Disk 106.

After reporting the segments to destage to the Host 10, the Destage Zone is advanced, as shown by Step 547. In particular, the UPPER-BOUND and LOWER-BOUND pointers are incremented to maintain the appropriates positions relative to the REPLACEMENT CANDIDATE pointer.

Having described the preferred embodiment of the invention in the drawings and accompanying description, those skilled in the art will recognize that various modifications to the exemplary embodiment could be made without departing from the scope and spirit of the claims set forth below:

That which is claimed is:

1. In a cache system having a plurality of allocable segments for storing cached data, wherein the cache system searches the plurality of allocable segments for data referenced by cache commands and provides access to the referenced data if the referenced data is present in the cache, a method for managing allocation of the plurality of allocable segments comprising the steps of:

(a) establishing a replacement candidate segment, wherein said replacement candidate segment is the first one of the plurality of allocable segments to be considered for allocation if the referenced data is not present in the plurality of allocable segments;

(b) establishing a recently used zone ahead of said replacement candidate segment, wherein said recently used zone encompasses a predetermined number of the plurality of allocable segments, said predetermined number being less than the plurality of allocable segments;

(c) designating a segment as recently used if reference is made to data and the data resides in a segment within said recently used zone;

(d) allocating said replacement candidate segment if the referenced data is not present in the plurality of allocable segments and said replacement candidate segment has not been designated recently used;

(e) designating said replacement candidate segment as not recently used if the referenced data is not present in the plurality of allocable segments and said replacement candidate segment is presently designated as recently used;

(f) selecting a succeeding segment for use as said replacement candidate segment;

(g) advancing said recently used zone; and (h) repeating steps (d) through (g) until said replacement candidate segment is allocated.

2. The method of claim 1, wherein said recently used zone begins at said replacement candidate segment.

3. The method of claim 2, wherein said predetermined number of is less than or equal to three-fourths the number of allocable segments in the cache.

4. The method of claim 1, wherein said selecting step (f) selects the next addressable segment for use as said replacement candidate segment.

5. In a post-store cache system having a plurality of allocable segments for storing cached data, wherein the cached data is accessible by a plurality of hosts and each of the hosts is coupled and has access to one or more disks from which data is cached, and selected ones of the disks are exclusively accessible by selected ones of the hosts wherein the cache system searches the plurality of allocable segments for data referenced by cache commands issued by the plurality of hosts and provides access to the referenced data if the referenced data is present in the cache, a method for managing allocation of the plurality of allocable segments, comprising the steps of:

establishing a replacement segment, wherein said replacement segment is one of the plurality of allocable segments to be allocated if the referenced data is not present in the plurality of allocable segments;

establishing a destage zone ahead of said replacement segment, wherein said destage zone encompasses a predetermined number of the plurality of allocable segments, said predetermined numbering being less than the plurality of allocable segments;

destaging one or more written segments from said destage zone if data referenced by a cache command is not present in the plurality of allocable segments and said one or more written segments have not been recently referenced;

allocating the replacement segment if the data referenced in the cache command is not present in the plurality of allocable segments;

selecting a succeeding segment for use as said replacement segment when said replacement segment is allocated; and advancing said destage zone when said succeeding segment is selected.

6. The method of claim 5, wherein said destage zone leads said replacement segment by approximately one-half the number of the plurality of allocable segments.

7. The method of claim 5, wherein said destaging step further includes the steps of:

selecting for destaging one or more segments in said destage zone which are to be destaged to a disk to which the host which issued the cache command has access; and reporting to the host which issued the cache command said one or more segments from said selecting for destaging step.

8. The method of claim 7, further comprising the step of searching the plurality of allocable segments for segments that have disk addresses that are contiguous to disk addresses of said one or more segments from said selecting for destaging step, wherein said reporting step further includes reporting the segments found in said searching step.

9. In a post-store cache system having a plurality of allocable segments for storing cached data, wherein the cached data is accessible by a plurality of hosts and each of the hosts is coupled and has access to one or more disks from which data is cached, and selected ones of the disks are exclusively accessible by selected ones of the hosts wherein the cache system searches the plurality of allocable segments for data referenced by cache commands issued by the plurality of hosts and provides access to the referenced data if the referenced data is present in the cache, a method for managing allocation of the plurality of allocable segments, comprising the steps of:

(a) establishing a replacement candidate segment, wherein said replacement candidate segment is the first one of the plurality of allocable segments to be examined for allocation if a referenced segment is not present in the plurality of allocable segments;

(b) establishing a recently used zone ahead of said replacement candidate segment, wherein said recently used zone encompasses a predetermined number of the plurality of allocable segments, said predetermined number being less than the plurality of allocable segments;

(c) establishing a destage zone ahead of said replacement candidate segment, wherein said destage zone encompasses one or more of the plurality of allocable segments;

(d) destaging one or more written segments from said destage zone if data referenced by a cache command is not present in the plurality of allocable segments and said one or more written segments have not been recently referenced;

(e) designating a segment as recently used if reference is made to the segment and the segment is within said recently used zone;

(f) allocating said replacement candidate segment if the referenced data is not present in the plurality of allocable segments and said replacement candidate segment has not been designated recently used;

(g) designating said replacement candidate segment as not recently used if the referenced data is not present in the plurality of allocable segments and said replacement candidate segment is presently designated as recently used;

(h) selecting a succeeding segment for use as said replacement candidate segment;

(i) advancing said recently used zone;

(j) advancing said destage zone; and (k) repeating steps (f) through (j) until said replacement candidate is allocated.

10. The method of claim 9, wherein said destaging step includes the steps of:

selecting for destaging one or more segments in said destage zone which are to be destaged to a disk to which the host which issued the cache command has access;

searching the plurality of allocable segments for segments that have disk addresses that are contiguous to disk addresses of said one or more segments from said selecting for destaging step; and reporting to the host which issued the cache command said one or more segments from said selecting for destaging step and the segments from said searching step.

11. In a post-store cache system having a plurality of allocable segments for storing cached data, wherein the cached data is accessible by a plurality of hosts and each of the hosts is coupled and has access to one or more disks from which data is cached, and selected ones of the disks are exclusively accessible by selected ones of the hosts wherein the cache system searches the plurality of allocable segments for data referenced by cache commands issued by the plurality of hosts and provides access to the referenced data if the referenced data is present in the cache, a apparatus for managing allocation of the plurality of allocable segments, comprising:

a plurality of recently used indicators, wherein each of the plurality of allocable segments is associated with one of said plurality of recently used indicators and each of said plurality of recently used indicators signifies whether a segment has been recently referenced;

a replacement pointer which references a replacement segment, wherein said replacement segment is a first one of the plurality of allocable segments and is the first segment to be considered for allocation;

a recently used zone pointer which references a second one of the plurality of allocable segments, wherein segments ahead of said replacement pointer and behind said recently used zone pointer form a recently used zone;

cache detection means, responsive to the cache commands and interfaced with the plurality of allocable segments, for detecting whether the data referenced by a cache command is present in the plurality of allocable segments, for generating a hit signal if the data referenced by a cache command is present in the plurality of allocable segments, and for generating a miss signal if the data referenced by a cache command is not present in the plurality of allocable segments;

designation means responsive to said hit-signal and interfaced with said plurality of recently used indicators, said replacement pointer, and said recently used zone pointer for setting one of said plurality of recently used indicators to signify that a segment was recently referenced if the segment referenced by a cache command is within the range of addresses formed by said replacement pointer and said replacement zone pointer; and allocation means responsive to said miss signal and interfaced with said replacement pointer, said plurality of recently used indicators, and said recently used zone pointer for allocating said replacement segment if said one of said plurality of recently used indicators which is associated with said replacement segment indicates that said replacement segment has not been recently referenced, and for advancing said replacement pointer and said recently used zone pointer if said one of said plurality of recently used indicators which is associated with said replacement segment indicates that said replacement segment has been recently referenced.

12. The apparatus of claim 11, further comprising:

a lower-bound pointer which references a lower-bound-segment, wherein said lower-bound-segment is a third one of the plurality of allocable segments;

an upper-bound pointer which references an upper-bound-segment, wherein said upper-bound-segment is a fourth one of the plurality of allocable segments, whereby segments within the range of segment addresses of said lower-bound pointer and said upper-bound pointer for a destage zone;

destage means responsive to said miss signal and interfaced with said lower-bound pointer and said upper-bound pointer for destaging selected segments from said destage zone when said miss signal is active.

13. The apparatus of claim 12, wherein said selected segments are segments to be destaged to a disk to which the host which issued the cache command has access.

* * * * *